W. R. STRICKLAND.
WIND SHIELD CONSTRUCTION.
APPLICATION FILED MAY 2, 1914.
1,258,057.
Patented Mar. 5, 1918.
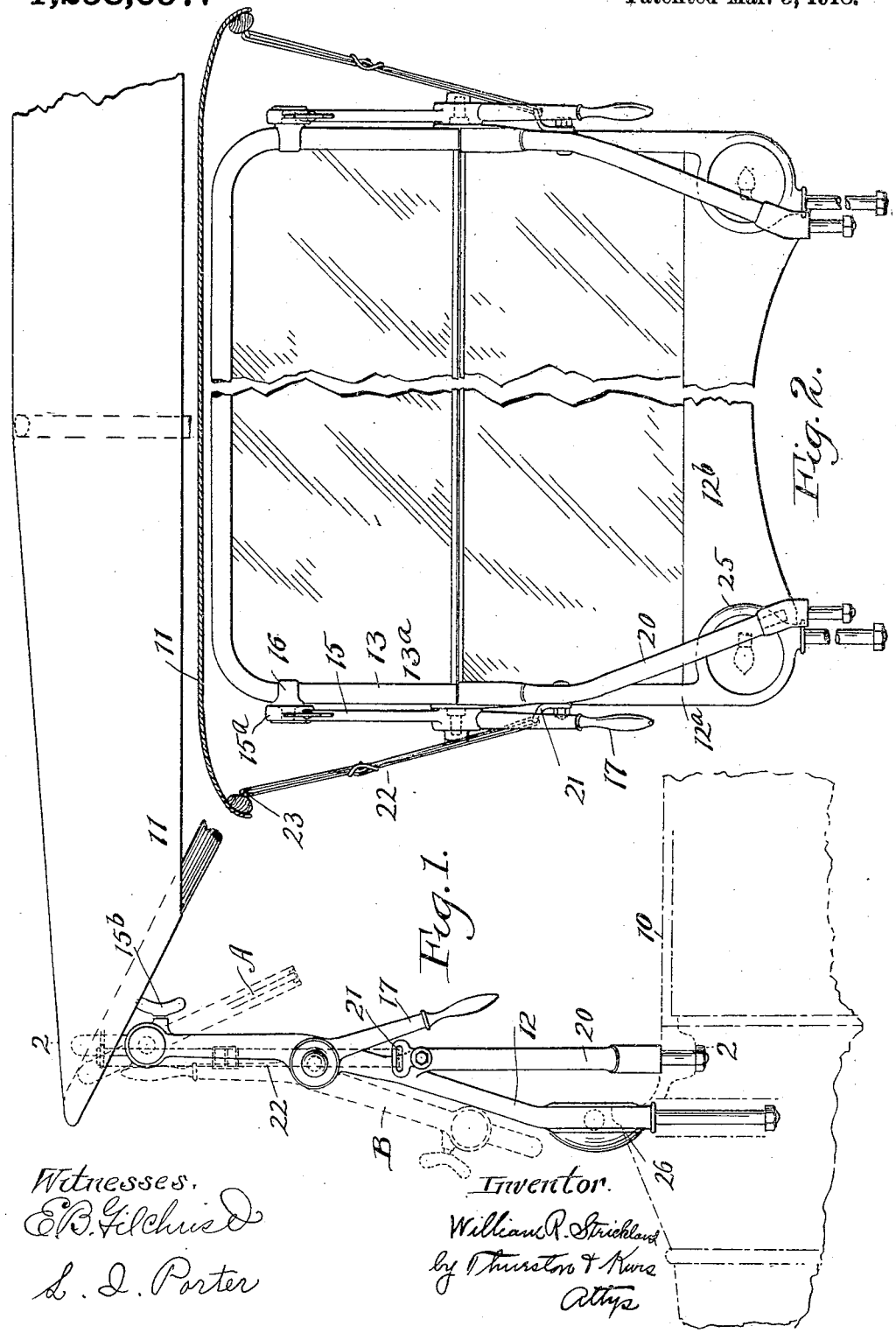
Witnesses.
E. B. Gilchrist
L. I. Porter
Inventor.
William R. Strickland
by Thurston & Kwis
Attys

UNITED STATES PATENT OFFICE.

WILLIAM R. STRICKLAND, OF CLEVELAND, OHIO, ASSIGNOR TO THE PEERLESS MOTOR CAR COMPANY, OF CLEVELAND, OHIO, A CORPORATION OF OHIO.

WIND-SHIELD CONSTRUCTION.

1,258,057.   Specification of Letters Patent.   Patented Mar. 5, 1918.

Application filed May 2, 1914. Serial No. 835,835.

*To all whom it may concern:*

Be it known that I, WILLIAM R. STRICKLAND, a citizen of the United States, residing at Cleveland, in the county of Cuyahoga and State of Ohio, have invented a certain new and useful Improvement in Wind-Shield Construction, of which the following is a full, clear, and exact description.

This invention relates to motor vehicles, and especially to certain improvements in the construction of the wind shields and of the means for attaching the front part of the top thereto.

One of the objects of the invention is to provide means by which the top section of the wind shield may be shifted from normal position downwardly and outwardly to a position in front of and alongside the lower wind shield section, or from its lowered position to the upright position, without requiring the operator to get out of the car to raise the upper wind shield section, or to reach outwardly through the wind shield opening, so that he can grasp the edge of the wind shield section to elevate the same.

Additionally, the invention aims to provide means whereby the top may be effectively supported or attached to the wind shield construction, and in such a manner, or with such an arrangement of top supporting straps and wind shield braces that the stresses created by the swaying of the top are transmitted almost entirely through the braces to the body of the car, and not to the frame of the wind shield itself.

The above and other objects are accomplished by my invention, which may be briefly summarized as consisting in certain novel details of construction and combinations and arrangement of parts which will be described in the specification and set forth in the accompanying claims.

In the accompanying sheet of drawings, Figure 1 is a side view of a portion of the vehicle or motor car equipped with my invention; and Fig. 2 is a sectional view substantially along the line 2—2 of Fig. 1.

Referring, now, to the drawings, 10 represents the body of usual or common construction,—the body being here shown by dotted lines. The car is provided also with a top 11, which is also of common construction. At the front of the body is a wind shield composed of a lower section 12 which is rigid with the body, and an upper section 13. The lower section 12 includes a frame 12$^a$ which, as will be observed from Fig. 1, extends upwardly from the cowl, and thence is inclined rearwardly. Mounted on suitable studs projecting outwardly from the upper part of the frame 12$^a$ of the lower wind shield section are a pair of hubs or bosses 14, provided with integral arms 15 which carry the upper wind shield section 13. The upper section 13 includes a frame 13$^a$, from the upper part of which project supporting members 16, which engage in bosses 15$^a$ at the upper ends of the shield supporting arms 15. The outer parts of the members 16 are journaled in the bosses 15$^a$, so that the upper wind shield section 16 can be turned or swiveled relative to the arms 15, as shown by the dotted line position A of Fig. 1. The upper wind shield section can be secured in any position relative to the arms 15 by thumb screws 15$^b$.

Normally, the upper wind shield section and the supporting arms 15 are vertical, and these arms, together with the upper wind shield section, are adapted to be swung downwardly and outwardly to the dotted line position B in which the upper wind shield section is parallel to and lies just in front of the lower section 12.

To shift the upper wind shield section from normal position to its lowered position, or vice versa, it is generally necessary for the operator either to get out of the car to do the shifting or he is required to reach through the wind shield opening so that he can grasp the lower edge of the movable section. This is often inconvenient, especially during inclement weather. In the attainment of the principal object of my invention, *i. e.*, to provide convenient means by which the upper wind shield section can be raised or lowered, I provide integral with the hubs or bosses 14, in addition to the arms 15 which support the upper wind shield section, arms or levers 17 having handles which may be grasped by the operator. It is not essential that these levers be provided at both sides of the car, as one will generally suffice, but two of these shifting arms or levers are here shown, one at each side of the wind shield. The arms 17 are displaced from the arms 15 nearly 180 degrees, so that when the arms 15 are in normal upright position, the arms 17 are nearly vertical but project inwardly somewhat from the vertical plane, passing through the axis of the pivotal movement of the arms 15 and 17. In fact, the arms 17 make the same angle with respect to the arms 15 as the arms 15 make with the inclined portion of the lower wind shield section. In consequence of this arrangement, when the upper wind shield section is in the dotted line position B,— that is, swung forwardly and downwardly in front of the lower wind shield section, the arms 17 are vertical, as shown by the dotted line position of the arms 17, so that they may be easily grasped and swung downwardly to elevate the movable wind shield section to normal position.

It will be observed that the wind shield is braced by rigid braces 20 which at their upper ends are secured to the frame of the lower wind shield section just below the point at which the arms supporting the upper wind shield section are pivoted. At their lower ends, the braces are rigidly attached to the body 10 of the car at the rear of the lower section of the wind shield. These braces lie in a vertical plane which is substantially the plane of the upper wind shield section when in its normal position, but they are inclined inwardly from a point near their upper ends to the car body. Near the upper ends of the braces are eyes 21 and to these eyes are attached top supporting straps 22 which at their upper ends are attached to eyes 23 secured to the front bow of the top 11 near the front end thereof. The upper eye 23 on the bow of the top is in the same vertical plane with the lower eye 21 on the brace, but is displaced outwardly or laterally with respect thereto. Furthermore, the disposition or inclination of the braces 20 and straps 22 is such that the straps are substantially in line with the braces whether the same are viewed from the side as in Fig. 1, or from the front or rear as viewed in Fig. 2. In Fig. 1, the straps are omitted for the sake of clearness. By reason of this arrangement, the pull of the straps or the stresses due to the movement of the top are transmitted to the car body in line with the braces and the major part of the stresses are transmitted to the car body through the braces themselves, so that the wind shield is to a large measure relieved of these stresses. The construction just described is an improvement over the construction disclosed in the patent to George R. Wadsworth, No. 1,070,485, dated August 26th, 1913, for top support.

A further feature of the present invention resides in forming in the wind shield frame, supports or bases for side lamps. It will be observed that at the lower corners of the frame 12ª of the wind shield there are provided circular supports 25 for side lamps 26. This results in a unitary structure having rigidity, durability and efficiency.

Having thus described my invention, what I claim is:

1. In combination in a motor vehicle, a car body, a wind shield at the front of the body composed of a lower rigid section and an upper hinged section, means for pivotally supporting the upper section from the lower section comprising members rotatably mounted at the two upper corners of the lower section, arms projecting from said members and attached to the ends of the upper wind shield section, and a shifting arm extending outwardly from one of said members, said arm projecting downwardly when the upper section is in normal upper position, and projecting upwardly when said upper section is swung downwardly and outwardly in front of the lower section.

2. In combination in a motor vehicle, a car body, a wind shield at the front of the body composed of a lower rigid section and an upper hinged section, means for pivotally supporting the upper section from the lower section comprising two members rotatably mounted at the two upper corners of the lower section and provided with upright arms extending alongside the outer ends or edges of the upper wind shield section, said upper wind shield section being pivotally connected to the upper ends of said arms whereby the section may be turned independently of said arms and when the arms are turned the upper section as a whole is turned about the pivotal axis of said hinging members, and a shifting arm projecting outwardly from one or both of said members and adapted to turn said members and the upper wind shield section.

3. In combination in a motor vehicle, a car body, a wind shield at the front of the body composed of a lower rigid section and an upper hinged section, two devices arranged opposite the side edges of the wind shield for supporting the upper section and composed of bosses pivotally supported at the upper corners of the lower section, said bosses having normal upright arms extending alongside the upper section and at their upper ends connected thereto and normal downwardly and rearwardly projecting arms for shifting said members, said last named arms being located beyond the side edges of the lower section.

4. In a motor vehicle, a car body, a wind shield at the front of the body composed of a lower rigid section and an upper section which is hinged to the upper corners of the lower section, the hinges including members arranged to be turned relative to the lower section and at their upper ends connected to the upper part of the upper section, and a shifting arm projecting from one of said members.

5. In combination in a motor vehicle, a car body, a wind shield at the front of the body composed of a lower rigid section and an upper movable section, hinge bosses pivoted at the upper corners of the lower section and having extensions which at their upper ends are connected to the upper part of the upper section, and a shifting arm extending from one or each of said bosses.

In testimony whereof, I hereunto affix my signature in the presence of two witnesses.

WILLIAM R. STRICKLAND.

Witnesses:
A. F. KWISS,
E. B. GILCHRIST.

Copies of this patent may be obtained for five cents each, by addressing the "Commissioner of Patents, Washington, D. C."